United States Patent
Pernyeszi

(10) Patent No.: US 9,819,208 B2
(45) Date of Patent: Nov. 14, 2017

(54) BATTERY MANAGEMENT CIRCUIT HAVING CELL CONNECTIONS FOR BATTERIES AND A PLURALITY OF CORRESPONDING WINDINGS AND DIODES

(71) Applicant: General Electronics Applications, Inc., Scotts Valley, CA (US)

(72) Inventor: Joseph Pernyeszi, Scotts Valley, CA (US)

(73) Assignee: GENERAL ELECTRONICS APPLICATIONS, INC., Scotts Valley, CA (US)

( * ) Notice: Subject to any disclaimer, the term of this patent is extended or adjusted under 35 U.S.C. 154(b) by 0 days.

(21) Appl. No.: 15/360,064

(22) Filed: Nov. 23, 2016

(65) Prior Publication Data

US 2017/0141586 A1   May 18, 2017

Related U.S. Application Data

(63) Continuation-in-part of application No. 14/517,618, filed on Oct. 17, 2014, now Pat. No. 9,537,329.

(60) Provisional application No. 62/043,653, filed on Aug. 29, 2014.

(51) Int. Cl.
  *H01M 10/46* (2006.01)
  *H02J 7/00* (2006.01)
  *H01M 10/48* (2006.01)
  *H01M 10/42* (2006.01)

(52) U.S. Cl.
  CPC .......... *H02J 7/007* (2013.01); *H01M 10/425* (2013.01); *H01M 10/482* (2013.01); *H02J 7/0014* (2013.01); *H02J 7/0021* (2013.01); *H02J 7/0045* (2013.01); *H01M 2010/4271* (2013.01)

(58) Field of Classification Search
  CPC ...... H02J 7/0013; H02J 7/0021; H02J 7/0019; H02J 7/0014; H02J 7/1423
  USPC ................... 320/116, 118, 119, 122
  See application file for complete search history.

(56) References Cited

U.S. PATENT DOCUMENTS

| | | | |
|---|---|---|---|
| 3,843,918 A * | 10/1974 | Rhyne | H02J 7/12 320/160 |
| 6,936,994 B1 * | 8/2005 | Gimlan | B60L 8/003 320/101 |
| 7,400,114 B2 | 7/2008 | Anzawa et al. | |
| 8,183,870 B1 | 5/2012 | Davies | |

(Continued)

*Primary Examiner* — Edward Tso
(74) *Attorney, Agent, or Firm* — Davis Wright Tremaine LLP; Philip H. Albert

(57) ABSTRACT

A battery management circuit maintains voltage balance during charging and discharging of a multi-cell, series connected battery stack. The circuit prevents any cell voltage from dropping below a voltage at which degradation of the battery can start. Each of the battery connections are connected with a first polarity across one secondary winding of a transformer through a first diode and connected with a polarity opposite to the first polarity across another secondary winding of the transformer through a second diodes, where, for the cell connections corresponding to each battery except the last in the series, the secondary winding connected through the corresponding first diode is the same as the secondary winding connected through the second diode to the cell connections corresponding to the subsequent battery in the series. The circuit also provides high efficiency voltage balancing during charging of the battery stack.

14 Claims, 10 Drawing Sheets

(56) References Cited

U.S. PATENT DOCUMENTS

| | | |
|---|---|---|
| 8,339,100 B2 | 12/2012 | Li et al. |
| 8,541,980 B2 * | 9/2013 | Moussaoui ........... H02J 7/0016 |
| | | 320/118 |
| 9,537,329 B2 * | 1/2017 | Pernyeszi ............. H02J 7/0014 |
| 2010/0237830 A1 | 9/2010 | Castelaz et al. |
| 2012/0032641 A1 | 2/2012 | Yun et al. |
| 2012/0217111 A1 * | 8/2012 | Boys ....................... H01F 38/14 |
| | | 191/10 |

* cited by examiner

BATTERY MANAGEMENT CIRCUIT HAVING CELL CONNECTIONS FOR BATTERIES AND A PLURALITY OF CORRESPONDING WINDINGS AND DIODES

CROSS-REFERENCE TO RELATED APPLICATIONS

This application is a continuation-in-part of U.S. application Ser. No. 14/517,618 filed Oct. 17, 2014, that in turn claims priority from U.S. Provisional Application No. 62/043,653 filed on Aug. 29, 2014, both of which are hereby incorporated in their entireties by this reference.

BACKGROUND

This application relates to battery management circuits.

Battery management circuits monitor the voltage across each cell or a small group of cells. Upon discharge, the load is disconnected when any cell voltage drops below a predetermined value. During charging, when any cell voltage reaches a predetermined voltage, a shunt is activated and bypasses some of the charging current while the charging continues. When the battery stack voltage reaches a predetermined value, charging is terminated. Battery chargers typically use some form of switching converter with a voltage and current limiter having a plus terminal and a minus terminal.

SUMMARY

A battery management circuit includes a plurality of N cell connections, a transformer, N first diodes and N second diodes, a drive circuit, and a cell voltage monitoring circuit. A corresponding N batteries are connectable by the N cell connections in series between a load output and ground such that the positive terminal of each battery in the series is connected to the negative terminal of the subsequent battery in the series, except that the negative terminal of the first battery in the series is connected to ground and that the positive terminal of the last battery is connected to the load output. The transformer has a primary winding and N+1 secondary windings. Each of the cell connections is connected with a first polarity across one of the secondary windings through a corresponding one of the first diodes and connected with a polarity opposite to the first polarity across another one of the secondary windings through a corresponding one of the second diodes. For the cell connections corresponding to each battery except the last in the series, the secondary winding is connected through the corresponding first diode is the same as the secondary winding connected through the second diode to the cell connections corresponding to the subsequent battery in the series. The drive circuit is connected to provide a voltage to the primary winding of transformer when enabled. The cell voltage monitoring circuit is configured to enable the drive circuit in response to the voltage of one or more of batteries being less than a predetermined limit.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Figure 1:
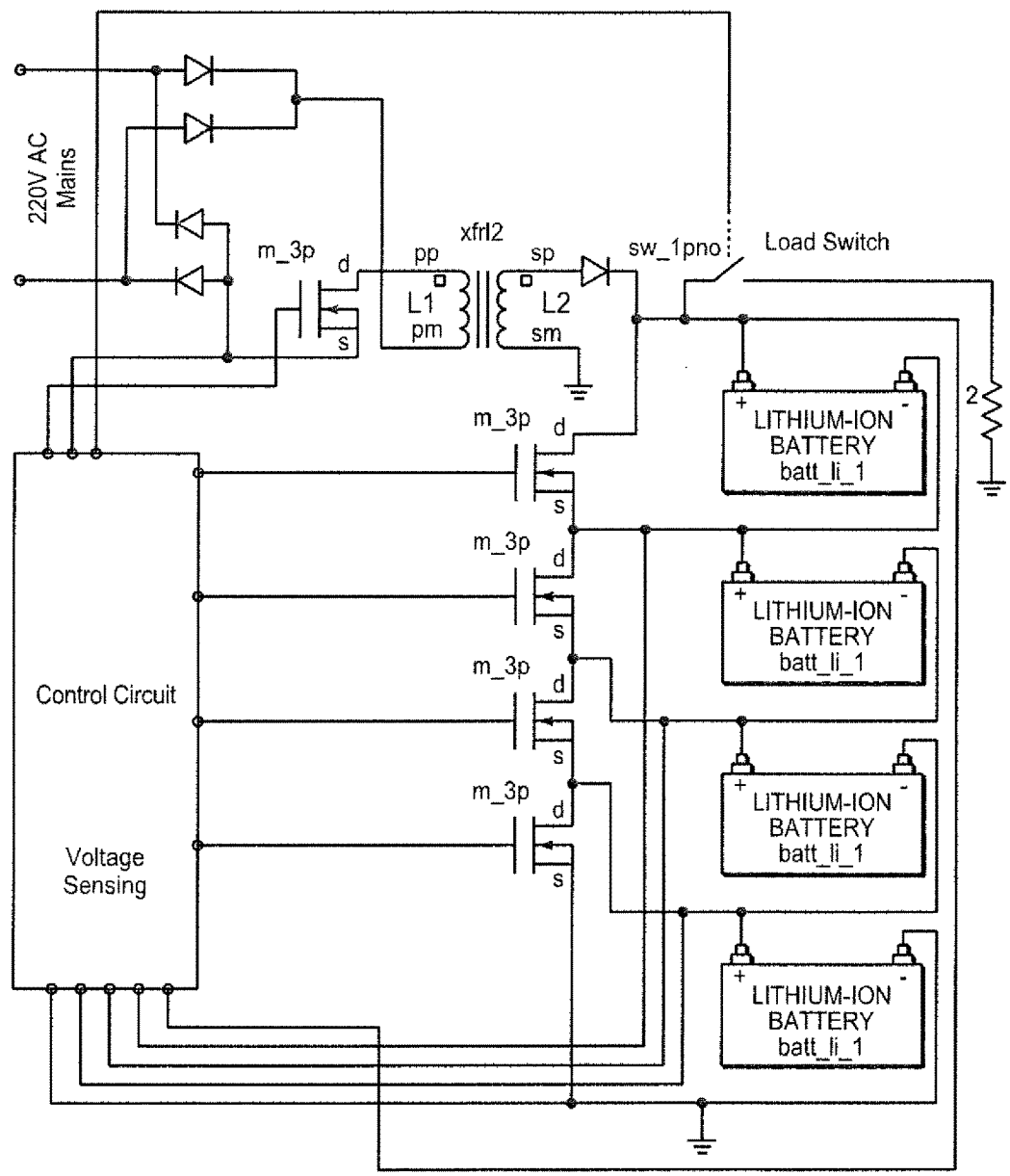
FIG. 1 shows one example of a battery management circuit.

Battery operated apparatus such as cordless tools, electric vehicles and backup systems (UPS) normally use multiple cell battery packs. The series connected multi-cell arrangement raises the output voltage to facilitate reduced current operation for a given power output. The increased voltage also matches the application to the available, low cost components to build the application circuits. The series connected cell stack provides that each cell works with the same current, both when charged and discharged. The individual cells in a typical battery pack are identical cells by design, but the cells have manufacturing tolerances and they are not exactly the same capacity. When charging such an imperfect battery pack, the smallest capacity cell will be fully charged before the other, slightly higher capacity cells. Overcharging a cell damages the cell and shortens its life significantly. To prevent the overcharging, the voltage across each cell is monitored and either the charging is terminated or a shunt is activated when the cell voltage reaches a predetermined value. The shunts bypass some of the charging current from the cell, thereby preventing it from being overcharged while the charging continues to fully charge the other cells.

When the battery pack is being discharged, the same cell voltage monitoring circuit will disconnect the load when any cell voltage drops below a predetermined voltage. A weak cell in the series cells will be exhausted before other cells. When a cell is discharged and the load is still connected, the other cells in the battery still supply current to the load and the voltage across the discharged cell will collapse and could eventually reverse polarity as the discharge continues. Terminating the discharge is necessary to prevent a weaker cell from getting damaged by preventing it from polarity reversal.

By way of example, if the circuit has a 10 Ah battery with one weak cell whose capacity is only 9 Ah, during charging the shunt across the 9 Ah will be activated while the other cells will still be charging until all cells are fully charged. During discharge the 9 Ah cell will be the first to be exhausted and the voltage across it will start dropping. Since the other cells in the battery still have 1 Ah left in them, they continue to supply current. Due to the series connection, this current will go through the 9 Ah cell and attempt to discharge it further. As the voltage keeps dropping, the battery management circuit detects that the 9 Ah cell has a very low voltage across it and disconnects the load. The result is that due to this protective action, the battery can only supply power as a 9 Ah battery. In other words, the total battery capacity has been reduced to the rating of the weakest battery.

Manufacturers have been characterizing the individual cells and when assembling a battery pack, use cells of similar capacity. This allows for all the cells to be charged or discharged at about the same time. The cells are binned according to their measured capacity. By way of example: if a 10 Ah battery pack is to be manufactured, then the individual cells are categorized into bins, such as 9.7 to 9.8, 9.8 to 9.9, 9.9 to 10, 10 to 10.1, 10.1 to 10.2 and 10.2 to 10.3 Ah. Battery packs are then assembled from the same bin.

A typical battery management circuit monitors the voltage across each cell or a small group of cells. Upon discharge, the load is disconnected when any cell voltage drops below a predetermined value. During charging, when any cell voltage reaches a predetermined voltage, a shunt is activated and bypasses some of the charging current while the charging continues. When the battery stack voltage reaches a predetermined value, charging is terminated. An example is shown in FIG. 1.

FIG. 1 shows an example of a battery management circuit. It includes 4 battery cells, a control circuit, a switching converter for charging and 4 shunt DMOS transistors. The control circuit monitors the cell voltages in the battery and activates one or more of the shunt DMOS transistors to prevent the overcharging of the weaker, lower capacity cells. The single source charging circuit with the DMOS switch and the transformer regulates the current that goes through each cell.

In an exemplary embodiment presented here, a battery management circuit maintains voltage balance during charging and discharging of a multi-cell, series connected battery stack. The circuit allows the entire energy content of the battery stack to be drained, as opposed to just monitoring the cells and turning off the discharge when the first cell voltage drops below a predetermined threshold. The circuit also provides high efficiency voltage balancing during charging of the battery stack conserving energy and keeping the temperature of the battery pack to a minimum.

Figure 2:
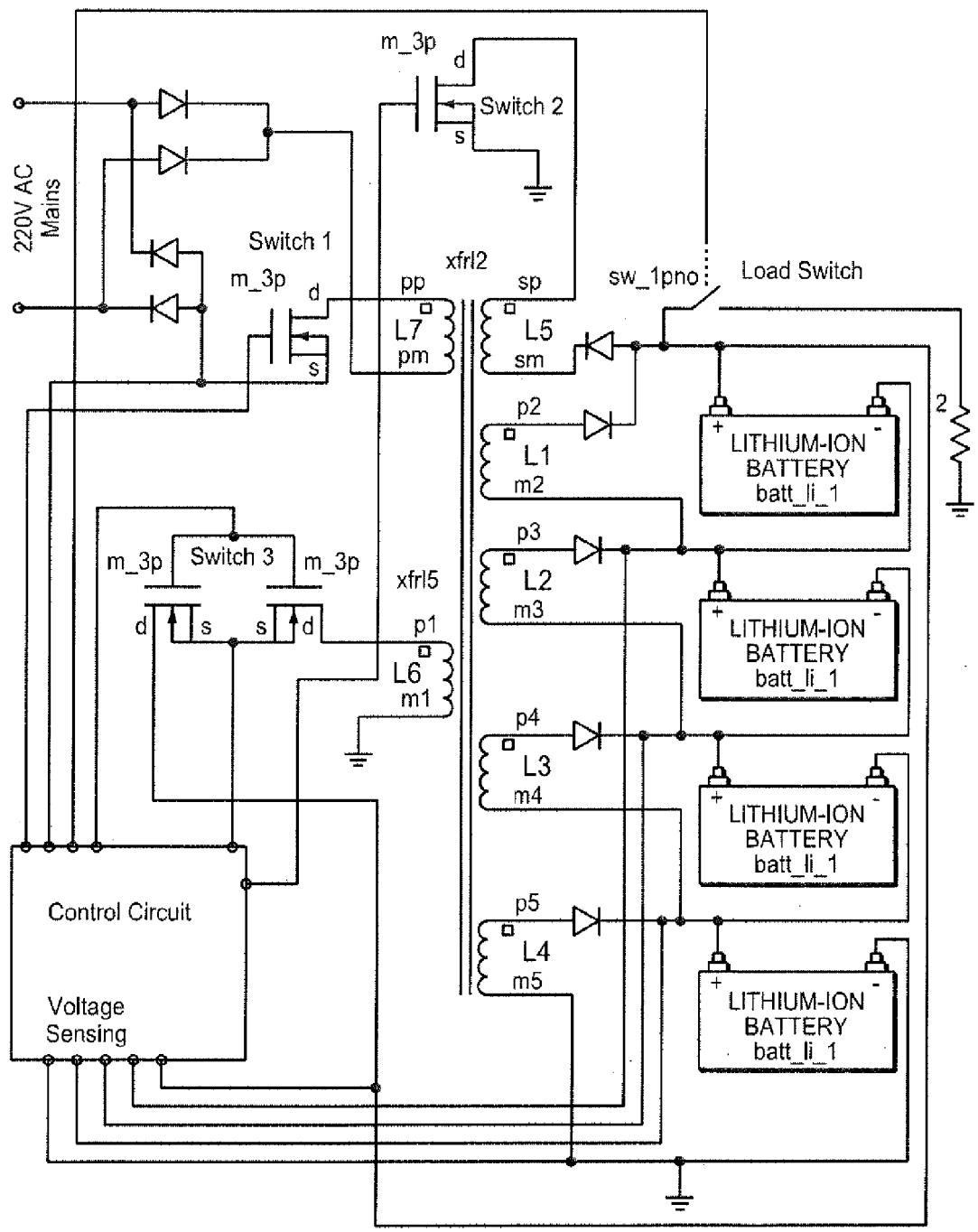
FIG. 2 shows an exemplary embodiment of a battery management system.

FIG. 2 shows an exemplary embodiment for battery management system. It has a multi-output transformer with a dedicated winding to charge each cell independently, windings L1-4, and a common higher voltage winding L6 that charges the battery through switch 3, which is operated as a synchronous rectifier, 4 batteries, a control circuit with voltage sensing circuitry, a bridge rectifier to turn the 220V AC to DC, switch 1 that forms a switching converter with winding L7 and voltage balancing circuit comprising switch 2 and winding L5. In FIG. 2, the circuit is connected to a load, represented by the resistor, by a load switch controlled by the control circuit. Depending on the application, the load may or may not be disconnected when the circuitry is charging the battery, where the load may only be disconnected when the battery main terminal voltage is at or below its minimum value. In some applications, such as for a vehicle, charge can be done and may even be advisable whenever the power is available to do so.

The battery management circuit as shown on FIG. 2 has a voltage sensing circuit that monitors the voltage across each cell or a small group of cells and a switching converter with two switching transistors. The switching converter has multiple, equal voltage outputs that are connected to each cell or a small group of cells as shown on FIG. 2. Upon discharging the battery, the cell voltages slowly drop as the battery is supplying power to the load. When any cell voltage in the battery drops below a predetermined level, the switching converter, here switch 2 and winding L5, is activated and provides a shunt current to the cell such that current from the weak cell is augmented by the shunt current supplied by the switching converter to maintain a minimum voltage across the cell.

The power to provide the shunt current to the weak cell comes from the main terminals of the battery, more precisely from the stronger cells of the battery pack. This process of power transfer continues until the entire stored energy of the battery pack is used up. When the main battery terminal voltage reaches a predetermined voltage, the load is disconnected and the switching converter is deactivated to stop the discharge of the battery. The transformer has two primary windings and it is the second winding L5 that is activated with switch 2. Switch 2 is best implemented using a low voltage DMOS transistor appropriate for the particular battery capacity and battery voltage.

Upon charging the battery, switch 1 and primary winding L7 is activated so that isolation from the power mains is provided. The circuit uses a switch, switch 3, to provide synchronous rectification to provide high efficiency and a slightly higher voltage to charge the battery on its main terminals. During this operation the other secondary windings L1-4 are inactive as there is not enough voltage on those windings to turn on the diodes. As the battery is being charged, the cell voltages are increasing and eventually one or more cells will have a high enough voltage approaching the fully charged terminal voltage for those cells. For example, this could happen when the battery is, say, at 90-95% charged of its capacity. When this condition is reached, the synchronous rectifier is deactivated, the charging is switched over to the balancing circuit and the current is reduced. Now only the stronger cells will be charged as they are further from their full capacity than the weaker cells. The weaker cells still receive a trickle of a current but the bulk of the power is directed to those cells that have not yet reached their full capacity. Since the overall charging current is reduced, the charging is finished with a more gentle current, which helps reduce the temperature rise of the individual cells. The gentle topping off the batteries helps extend the useful life of the batteries and is recommended by most battery manufacturers.

The exemplary battery management system is implemented by using the flyback concept for the switching converter. Other topologies, such as forward converter concept or the resonant converter concept can also be used for the switching converter without deviating from the principle of operation for the new battery management circuit, which allows for charging a battery with high efficiency without resistive shunts used in the prior art or having to terminate the discharge of the battery as soon as the weakest cell in the battery gets exhausted.

An additional benefit can be realized during manufacturing. Since this battery management circuit can balance the cell voltages, and it does that at high efficiency, the battery pack can be assembled out of somewhat different capacity batteries. The weaker cells will be helped by using energy from the stronger cells as the battery pack is nearing the end of its capacity. Instead of using the time consuming and expensive binning process, battery packs can be assembled from all the cells from the initial battery tests in the manufacturing line that meet the minimum capacity specification. In other words and using the above example, if the cells are classified as "good" if their capacity is above 9.7 Ah, then all "good" cells are suitable for use in a battery pack. This of course means that some cells will have a capacity of 9.7 Ah while some other cells maybe 10.3 Ah or even more. When the battery pack is charged, all cells will be charged to their full capacity without the weaker cells being overcharged. When the battery pack is being used and is discharging, all cells will be exhausted at the same time as the battery management circuit will balance the cells so energy is transferred from the stronger cells to the weaker cells so that the voltage on the weaker cells cannot drop below a specified voltage that is high enough to prevent the cell from being damaged.

As noted above, the circuitry of FIG. 2 has the feature of balancing of the battery loading and providing protection for a somewhat lower capacity, weak cell. The circuit of FIG. 3 is a subset of the circuit shown on FIG. 2 where, for clarity of explanation, only those components are shown that operate during the discharge of the battery and are actively work to balance the cells.

Figure 3:
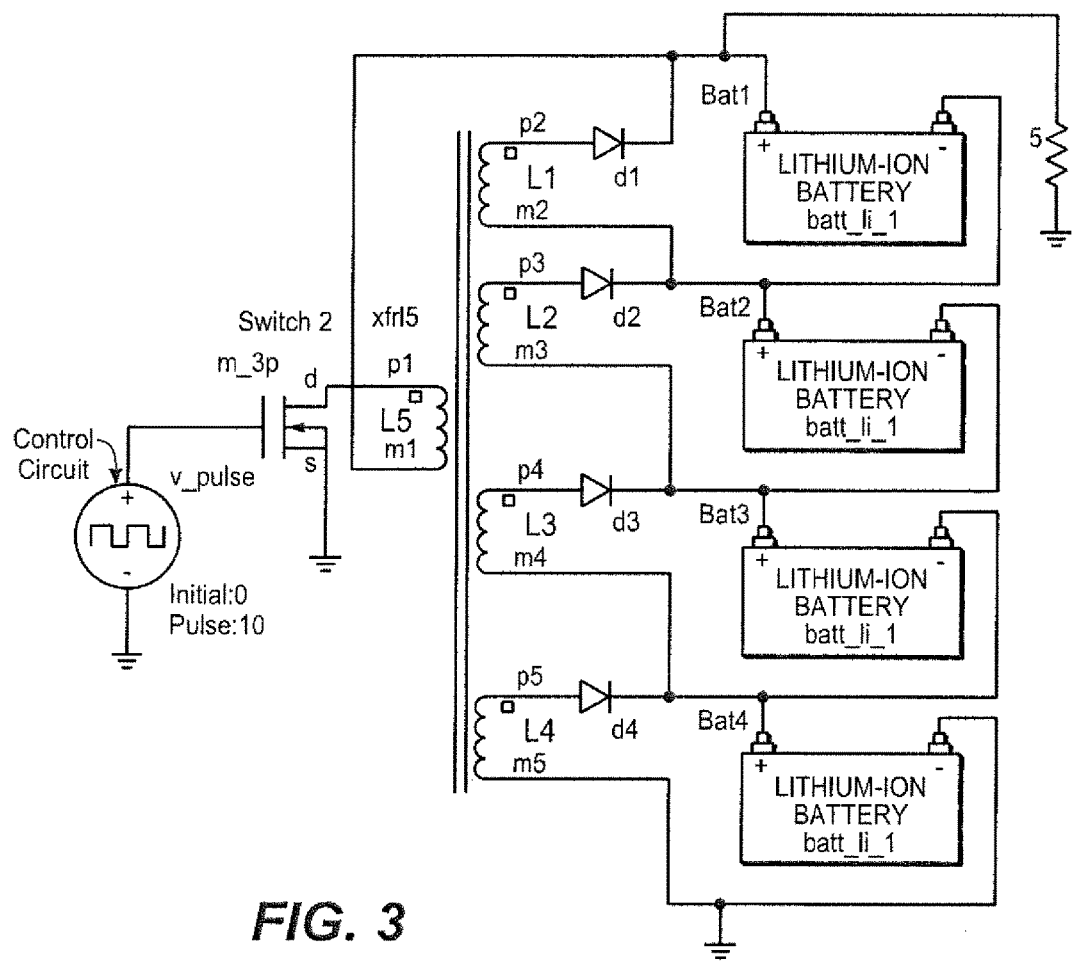
FIG. 3 illustrates some of the elements of FIG. 2.
Figure 4:
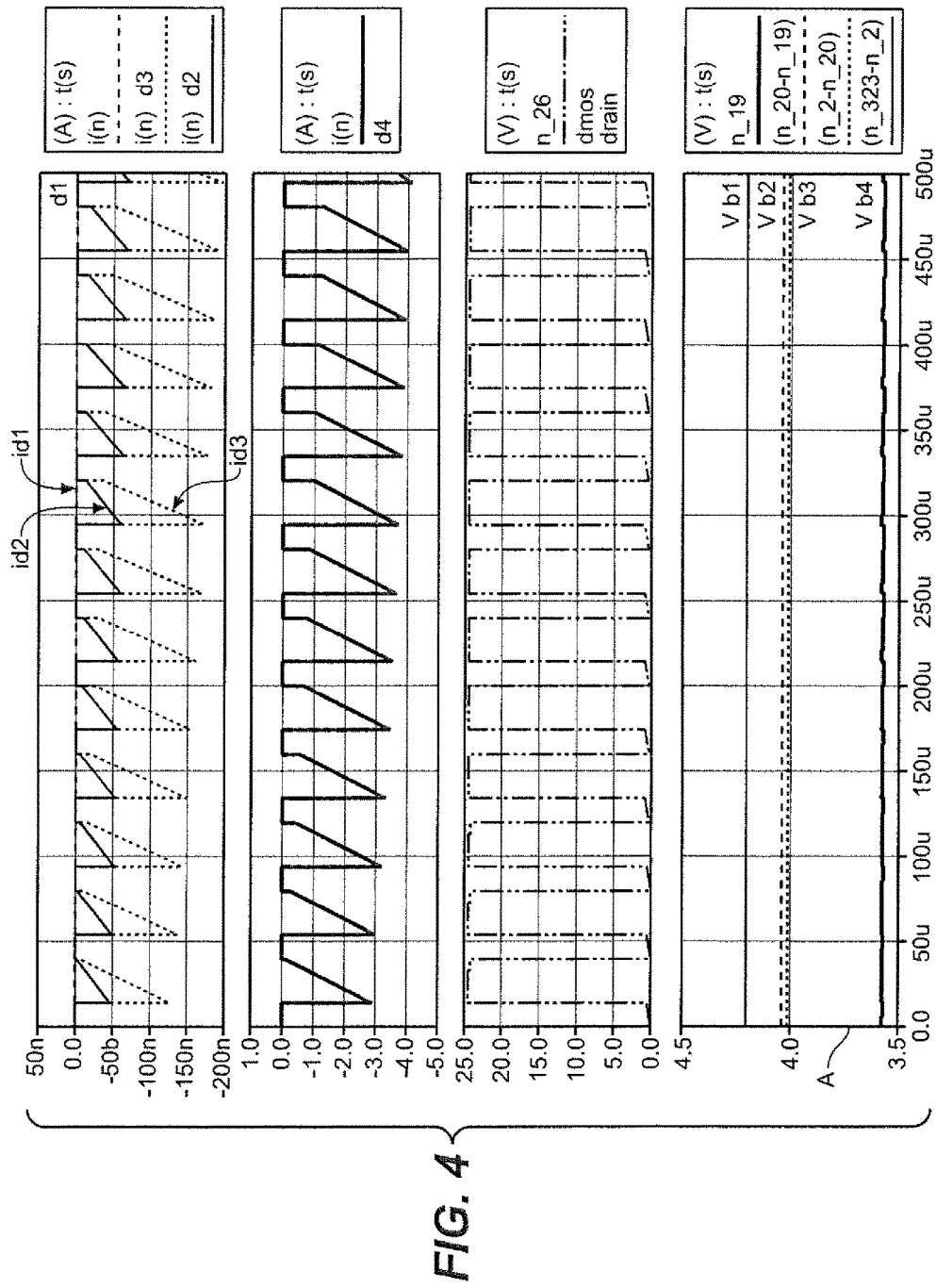
FIG. 4 is a set of waveforms illustrating the operation of some elements of FIG. 3.

To illustrate the operation of FIG. 3, an example is taken where Bat1 is still near its full charge as it is a strong cell, Bat2 and Bat3 are somewhat discharged and Bat4 is almost fully discharged as it is a cell that has degraded capacity. This is shown on stripe 4 of FIG. 4. Since the voltage across Bat4 is only 3.6V, the monitor circuit detected that this cell is almost completely discharged. The controller then activates the balancing circuit and the DMOS transistor switch 2 starts switching and transfers energy to Bat4 to keep its voltage from collapsing. In the exemplary embodiments, switch 2 and others of the switches are implemented as DMOS transistors, but other switches can be used as appropriate for the application with the control circuitry designed to deliver the suitable control voltage to the effect the proper operation of the switch.

The balancing function is illustrated here by using a flyback converter. The wave forms on FIG. 4 were obtained from a computer simulation. The top two stripes show the current through the diodes and the first 3 diodes, d1, d2, d3 only conduct nanoamps of current. However, the diode connected to Bat4 conducts 3-4A peak, attempting to hold up the voltage across Bat4. As such, the discharge does not have to be terminated and the battery is still supplying power to the load. Stripe 4 shows the individual cell voltages and the voltage is held at a safe level for Bat4, preventing a deep discharge that would damage the battery. The level indicated at "A" in stripe 4 schematically represents a level at which the balancing circuit would be activated. The circuit can be used to work with various kinds of batteries such as Ni—Cd, Ni—MH, lead-acid, and so on, where the value of this level will generally be different for different battery types.

If, as in a conventional battery management circuit, the voltage across Bat4 were allowed to collapse, the full terminal voltage of the battery would dip low enough to trigger the protection circuit and the load would be disconnected. At that point the battery would need to be taken out of service and charged, even though the battery still has most of its energy. The digital controller of FIG. 2 monitors the cell voltages and operates the DC/DC converter to more fully use up the energy stored in the battery.

Figure 5:
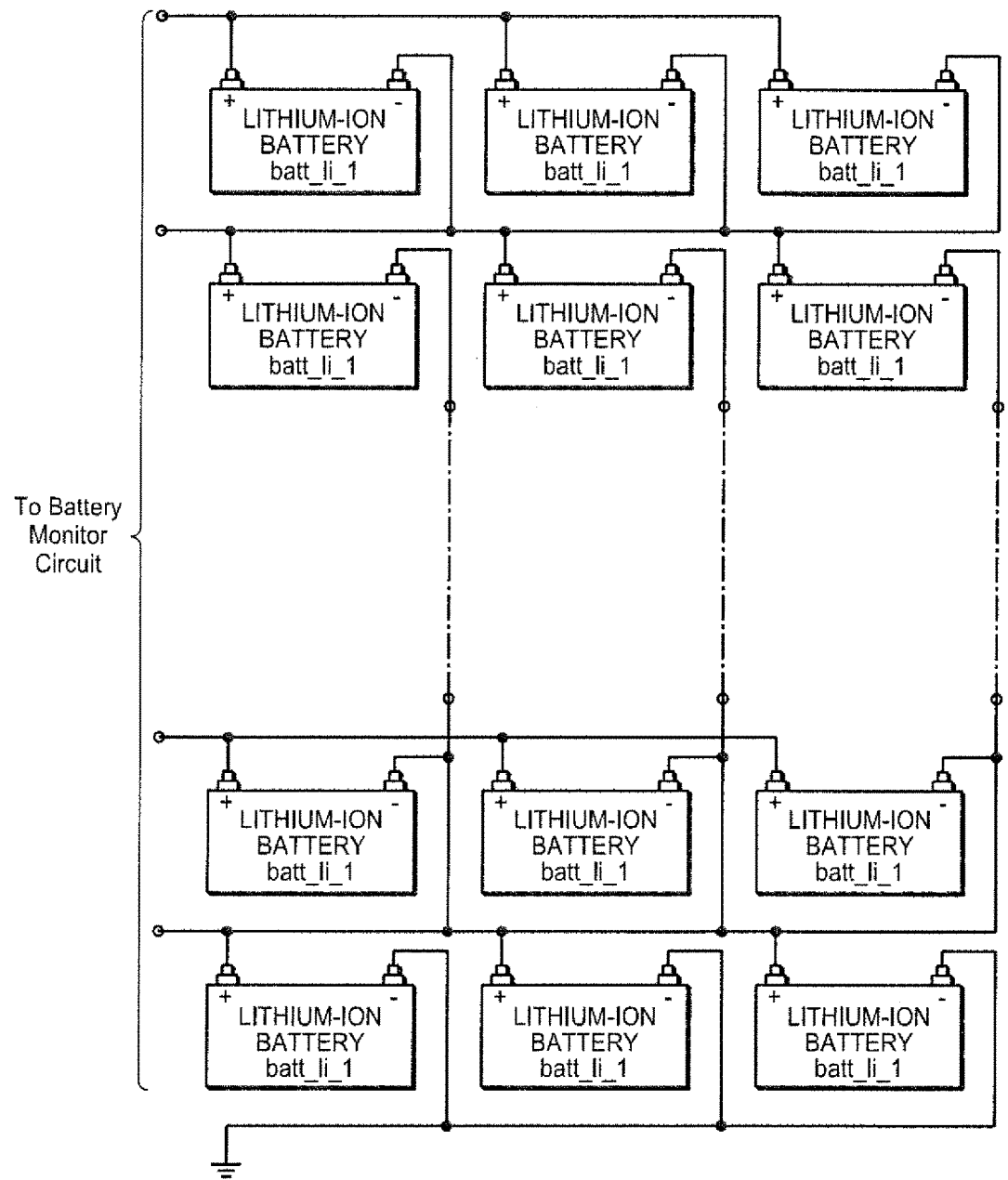
FIG. 5 illustrates connected multiple batteries in series at each level to provide higher current levels.

Battery packs having to supply larger current than is possible with a single string of series connected batteries can still be managed by the type of circuit shown in FIG. 2. In such applications, of which a small electric vehicle is a good example, several strings of series connected batteries are connected parallel as shown on FIG. 5. In the case of such a high capacity battery the simple cell monitoring and balancing functions can be implemented by connecting the cells of the several strings parallel such that the cell capacities add together while the voltage will be the same on these parallel connected cells. A common Li-ion cell size is 4.4 Ah at a fully charged voltage of 4.2V. By way of example, having 3 strings of cells, each string containing 50 cells, we get a 13.2 Ah battery whose terminal voltage is 220V. The total energy contained in such a battery is 2.9 kWh, sufficient for a small vehicle in town. Building much larger batteries based on the same principle as demonstrated and shown on FIG. 5 allows the battery management circuit to provide voltage balancing for the charge and discharge of a large battery suitable for powering a city bus. Such a large battery would have many parallel strings, possibly 100 or more, but as long as the cells of each string are connected parallel with the cells from the other strings, the battery management circuit will work the same as it does for a single string.

Figure 6:
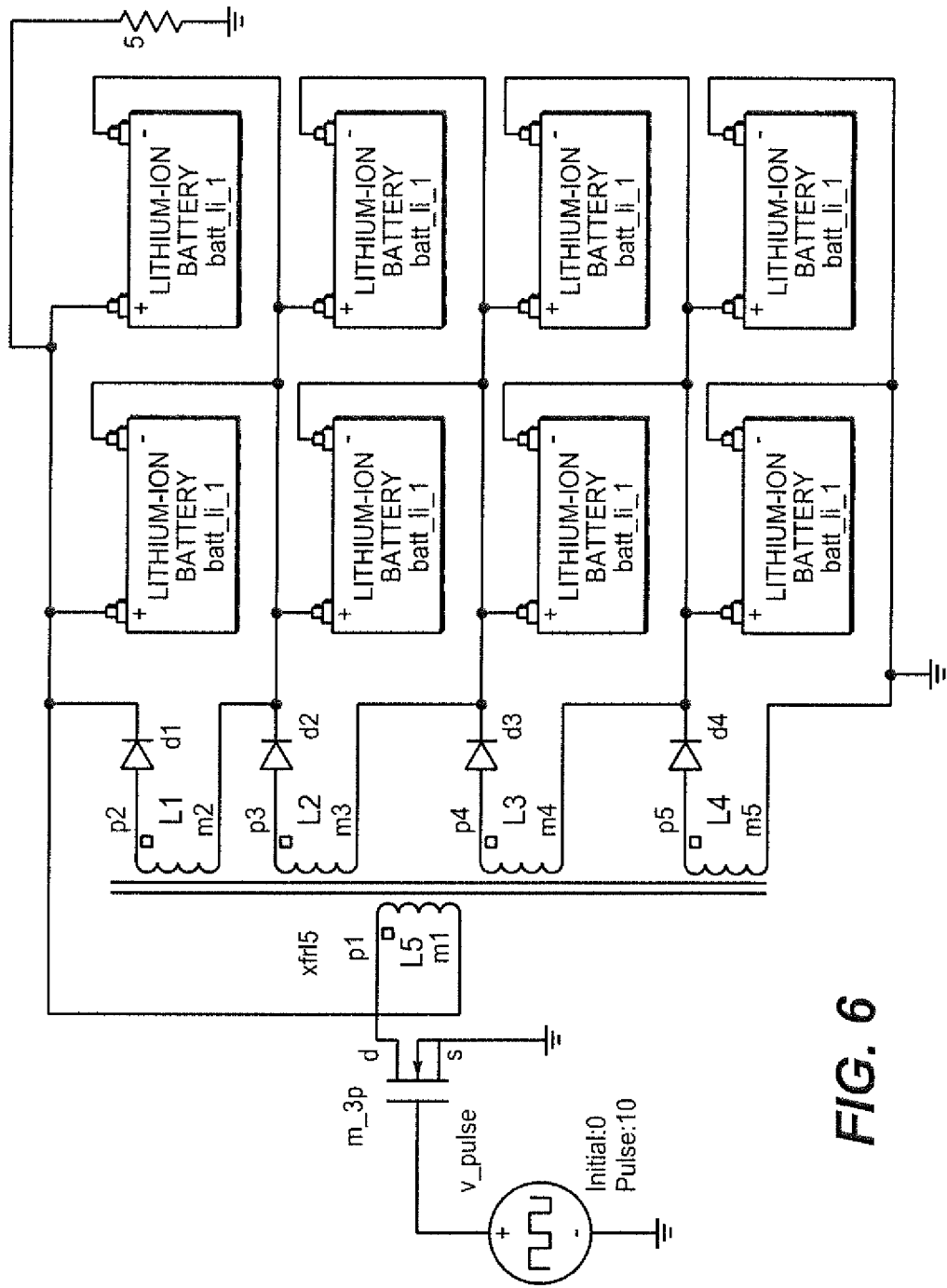
FIG. 6 is similar to FIG. 3, but with multiple batteries connected in parallel at each level.

A simple, 2 string battery pack in which each string has only 4 cells for simplicity is shown on FIG. 6 for the balancing mode of operation. As can be seen on FIG. 6, the battery capacity goes from 4.4 Ah to 8.8 Ah and the waveforms shown on FIG. 4 essentially stay the same.

In a vehicle application, the power demand can rise very quickly, but such increase is short in time. Nevertheless, such high load current events are detrimental to the life expectancy of the battery. In such applications, the use of super capacitors is beneficial in that the capacitors supply the short duration high current demand and greatly reduces the stress on the batteries. Since super capacitors are only available with low voltage ratings, 2.5-4.5V, they are connected in parallel with each cell and look like an extra string of battery cells. Super capacitors are routinely used in demanding applications and their use is fully compatible with the battery management circuit. They improve the overall system performance because batteries, when they are close to being fully discharged and have only 15-20% of their capacity left, normally exhibit a higher internal resistance. A sudden high current demand will lower the cell voltage and may temporarily trigger the low battery condition to be detected and activate the battery management circuit. Having the super capacitors supply the extra current prevents a false alarm indicating a low battery condition. However, when a cell is almost completely discharged, retaining only 3-5% of its capacity, the terminal voltage drops on a permanent basis which cannot be compensated for by the super capacitors and then the battery management circuit is activated providing the necessary voltage balancing of the cells.

Figures 7, 7A, 7B:
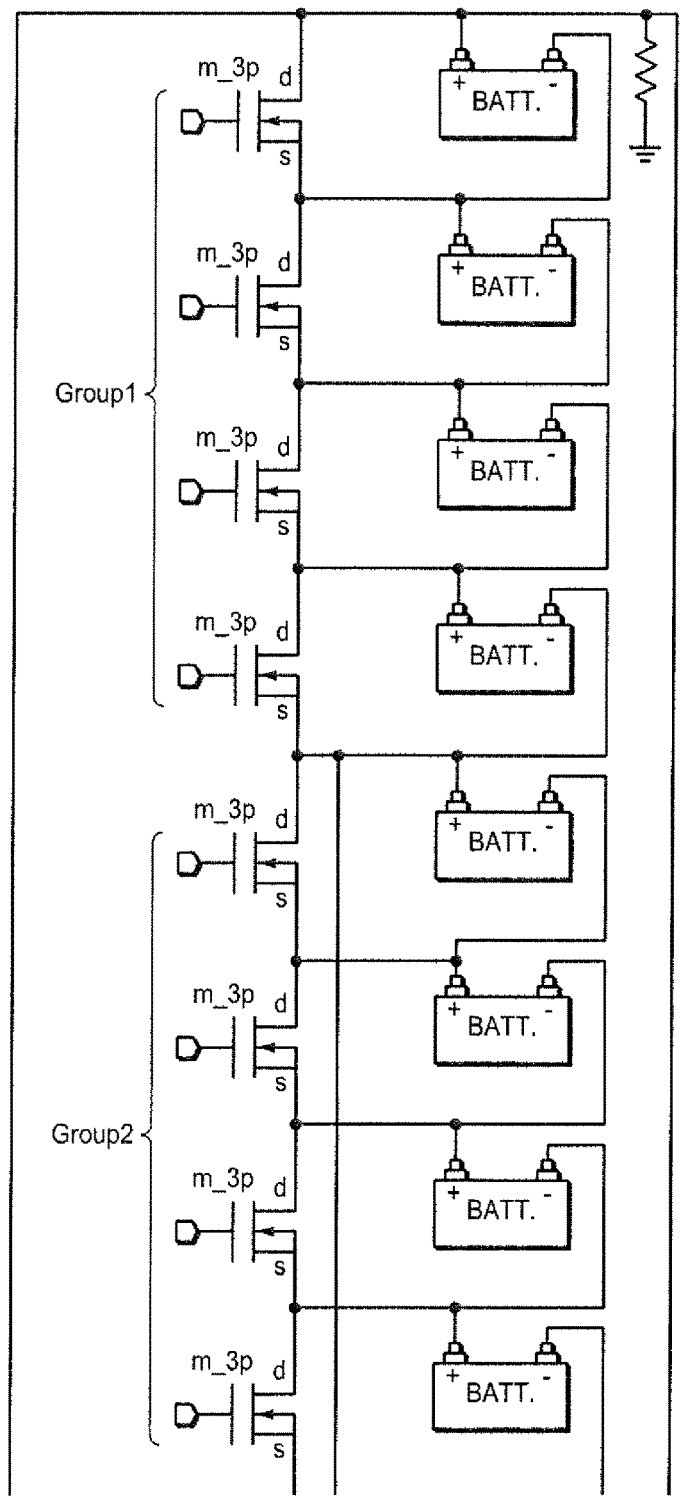
FIG. 7 is similar to FIG. 3, but with multiple groups of batteries and shunt transistors.
Figure 7B:
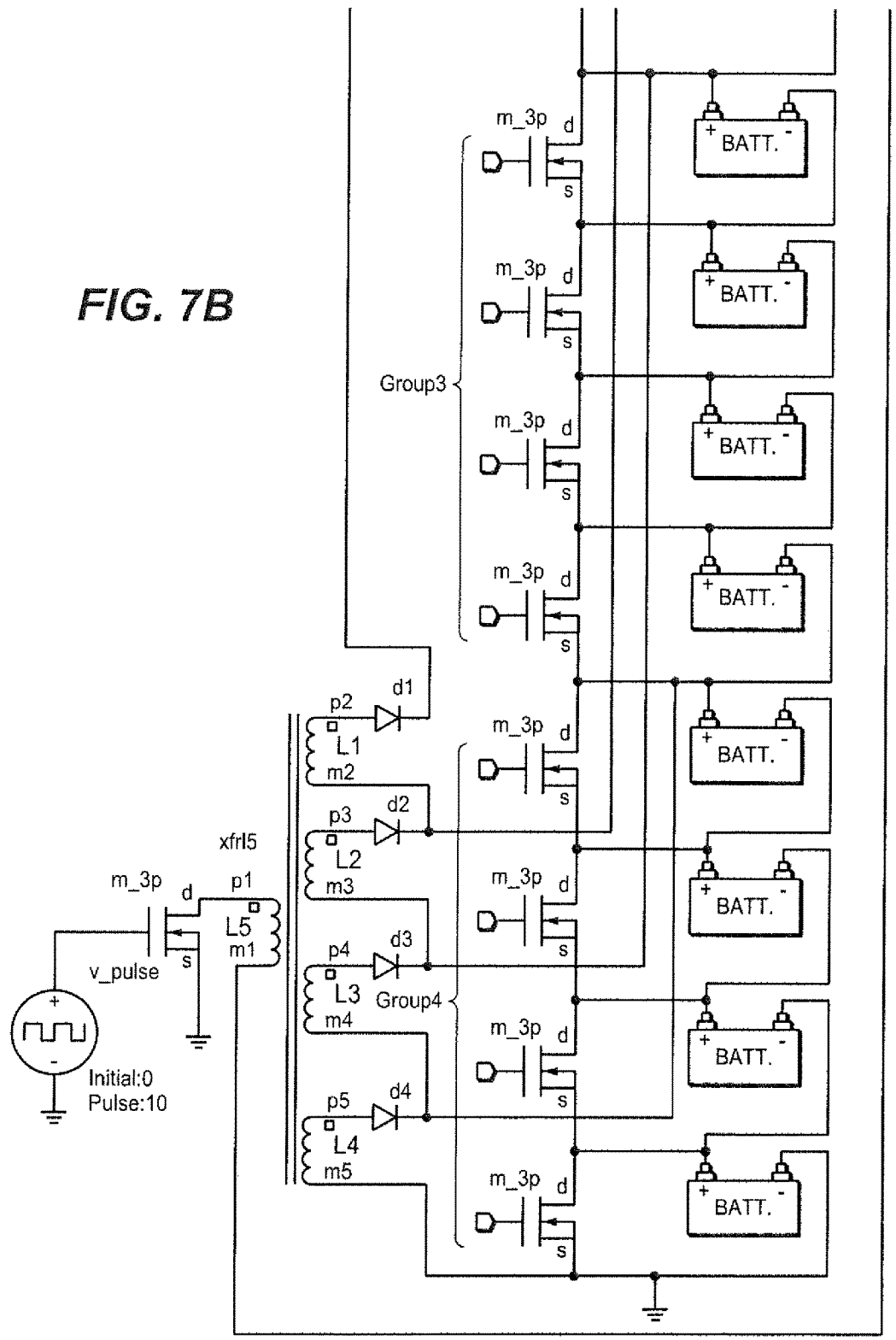

In another set of embodiments, a mixture of the shunt transistor of FIG. 1 and the balancing circuitry of FIG. 2 can be used. An example is illustrated in FIG. 7. In the example of FIG. 7 there are 4 groups of batteries, each having 4 cells. The balancing circuit can balance the groups but not the individual cells. This circuit has only four secondary windings, one for each of the groups, yet it balances 16 batteries. The shunt transistors are passive during discharge. When the voltage across any group drops below a predetermined level, the switching transistor is activated and the voltage on the weak group will be held up by the battery management circuit.

During charging, the group voltages will be balanced by the circuit similarly to what balancing is done to each cell as shown in FIG. 3, but within the groups the appropriate shunt is activated to prevent an individual cell overcharge. A variant of this circuit would be one that leaves out the shunt transistors. In this case, charging would be terminated when the voltage across a group reaches a certain level, analogous to the circuit where each cell has its own secondary winding, at which point the charging would be switched from the main terminals to the balancing operation of the circuit with the reduced charging current. While it would be possible to overcharge a weak cell in a group, the severity of the overcharging would be reduced compared to a system with no battery management.

Figure 8:
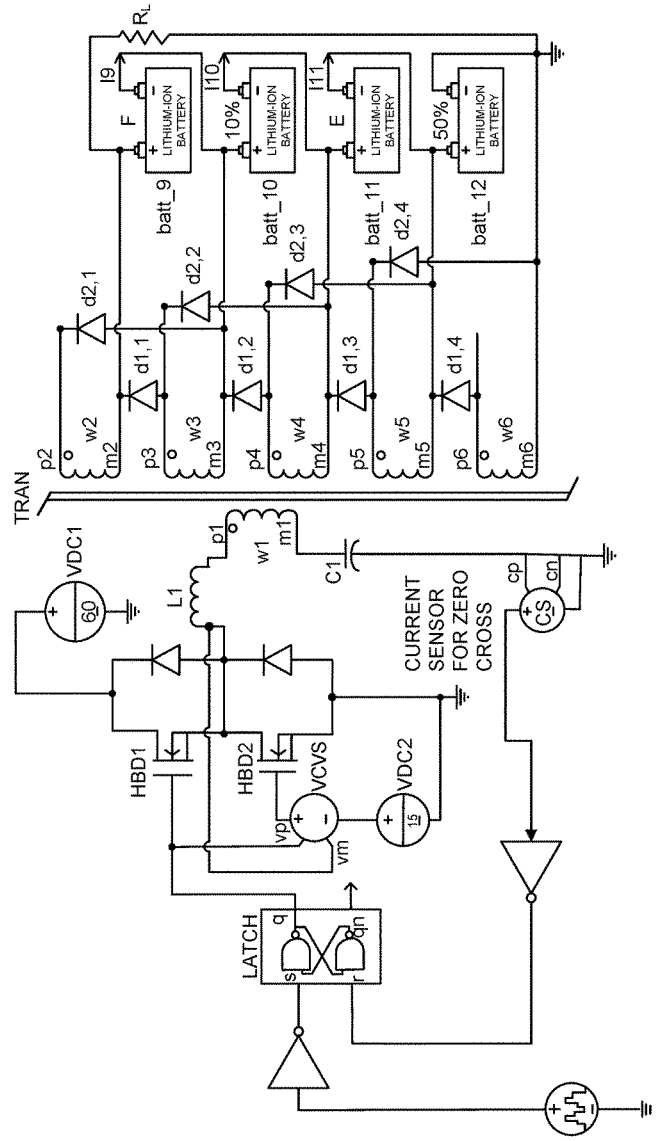
FIG. 8 illustrates another example of a battery management circuit.

FIG. 8 illustrates a more detailed or alternate set of embodiments for a battery management circuit. In this example, a resonant converter is powered by a half-bridge rather than the flyback topology used in FIG. 3. As with FIG. 3, for clarity of explanation FIG. 8 shows the power transfer section but does not show the voltage sensing and control circuitry, which can be similar to that discussed above and shown in FIGS. 1 and 2. Additionally, in other embodiments charging elements can be incorporated into FIG. 8 in much the same way as in FIG. 2 relative to FIG. 3.

The circuit of FIG. 8 can help to prevent any cell voltage from dropping below a voltage at which degradation of the battery can start, which differs from equalizing the voltages on the batteries and is a distinct feature when compared to other battery management circuits. Under the arrangement of FIG. 8, the focus is on using most of the energy stored in the battery to power the load while not allowing any degradation to the battery cells. In contrast, attempting to equalize the charges among the cells is wasteful as it implies that the charge from a stronger battery is used to charge a weaker battery. In such a process, losses incur at both ends, making the process less efficient than just holding the voltage across each cell at or slightly above the lower limit of the cell voltage.

The power transfer circuit of FIG. 8 includes the transformer TRAN in the middle with driver circuitry to the left and the connections for the battery cells to the right. (As noted above, the voltage sensing and control circuitry is not shown in FIG. 8; and the battery management system can also include a charging portion as well as the power transfer circuit.) The power transfer circuit is activated by the cell voltage monitoring circuit and this can happen when any of the cells drop to the lowest voltage limit. This limit is dependent on the battery construction and the battery chemistry employed, where the cell monitoring section can include a microcontroller that can be programmed with a limit value.

In the example of FIG. 8, only four cells (BATT_9, BATT_10, BATT_11, BATT_12) are shown connected at a corresponding set of terminals, but this can be extended to more cells, including by using variations similar to those discussed above with respect to FIGS. 5-7. For discussion purposes, the four cells are shown to have various degrees of charge, respectively fully charged (F), 10% charged, empty (E), and 50% charged. The load is represented by the resistance $R_L$ and the input voltage to the circuit is shown at the voltage source VDC1. For example, the load may be something like 0.6 ohm and the full voltage of the battery source 60V, as this is a practical battery value in applications such as an electrical bicycle or moped. The resonant capacitor C1 and resonant inductor L1, together with transformer TRAN, form a series resonant circuit.

As shown on to the right of the transformer in FIG. 8, each of the cell connection terminals is connected to one of the secondaries $W_{i+2}$ through a first diode $d_{1,i}$ oriented so that current can flow from the dot terminal of the winding to the positive battery terminal connection. This is similar to what is shown in FIG. 3. Each of the cell connection terminals is connected to another one of the secondaries $W_{i+1}$ through a second diode $d_{2,i}$ oriented so that current can flow from the negative battery terminal connection to the dot terminal of the winding. For each of the cell connections except that corresponding to the last battery of the series, the secondary where one battery connects through the corresponding first diode is the same as the secondary where the next battery is connected through the corresponding secondary diode, but such that the current will flow through the diodes with opposing polarities.

The transformer is constructed to have minimal leakage inductance between any two of the secondary windings (coils) W2-W6, but can allow for more leakage inductance from the primary winding (coil) W1 to the secondary windings W2-W6. The reduction of these parasitic inductances of the transformer and the diode forward voltage have a favorable change in the output characteristics of the circuit. A driver circuit applies a voltage to the primary winding W1 of the transformer, where the exemplary embodiment uses a half bridge structure. The quiescent state of the circuit is when half bridge's DMOS HBD1 output is in the low state. The low side transistor HBD2 is turned on and the high side transistor is turned off. When the circuit is activated, the low side transistor HBD2 is turned off and the high side transistor HBD1 is turned on. The output voltage of the half bridge will go to the VDC1 level (60V in this example) and C1 and L1 will start conducting. For example, the resonant frequency can be set to approximately 250 kHz. In approximately 2 usec, for this example, the current in the resonant circuit reaches zero as detected by the current sensor CS, which has a zero insertion voltage and outputs a voltage proportional to the current. The logic circuit of the RS flip-flop latch will turn off the high side transistor of the half bridge and will turn on the low side transistor thereof. The half bridge switches at zero current, providing very high efficiency operation. At zero current in the resonant circuit, the capacitor C1 is at maximum voltage and, as the low side transistor is switched on, the capacitor C1 will drive current through the transformer, L1 and the low side transistor.

The exemplary embodiment uses a half bridge to drive the primary winding W1, where the logic circuit drives the half bridge so that the high side DMOS HBD1 transistor is turned on while the low side DMOS HBD2 transistor is turned off at the same time. Then when the zero current is detected, this is reversed to turn on the high side DMOS HBD1 transistor and turn on the low side DMOS HBD2 transistor. The exemplary interface to apply the proper gate-source voltages to the two DMOS transistors uses a 15V source, VDC2, plus the level shifter VCVS, although other arrangements can be used. In the exemplary embodiment, one complication can arise from the high side transistor HBD1 having a source that goes up and down in voltage, from ground to 60V. As such, the gate drive voltage to this transistor must be referenced to the source of the transistor and provide either zero gate-source voltage or 15V gate-source voltage, depending on whether the transistor is to be in the OFF state or the ON state.

Looking at the battery with the lowest charge level as an example, the current of the first half cycle of the resonant circuit flows through the transformer and will provide current into the lowest voltage battery cell BATT_11 through P5 and diode $d_{1,3}$ from secondary winding W5. After the current in the resonant circuit changes direction, the current on the secondary side from secondary winding W4 of the transformer will go to BATT_11 through P4 and diode $d_{2,3}$.

Figure 9:
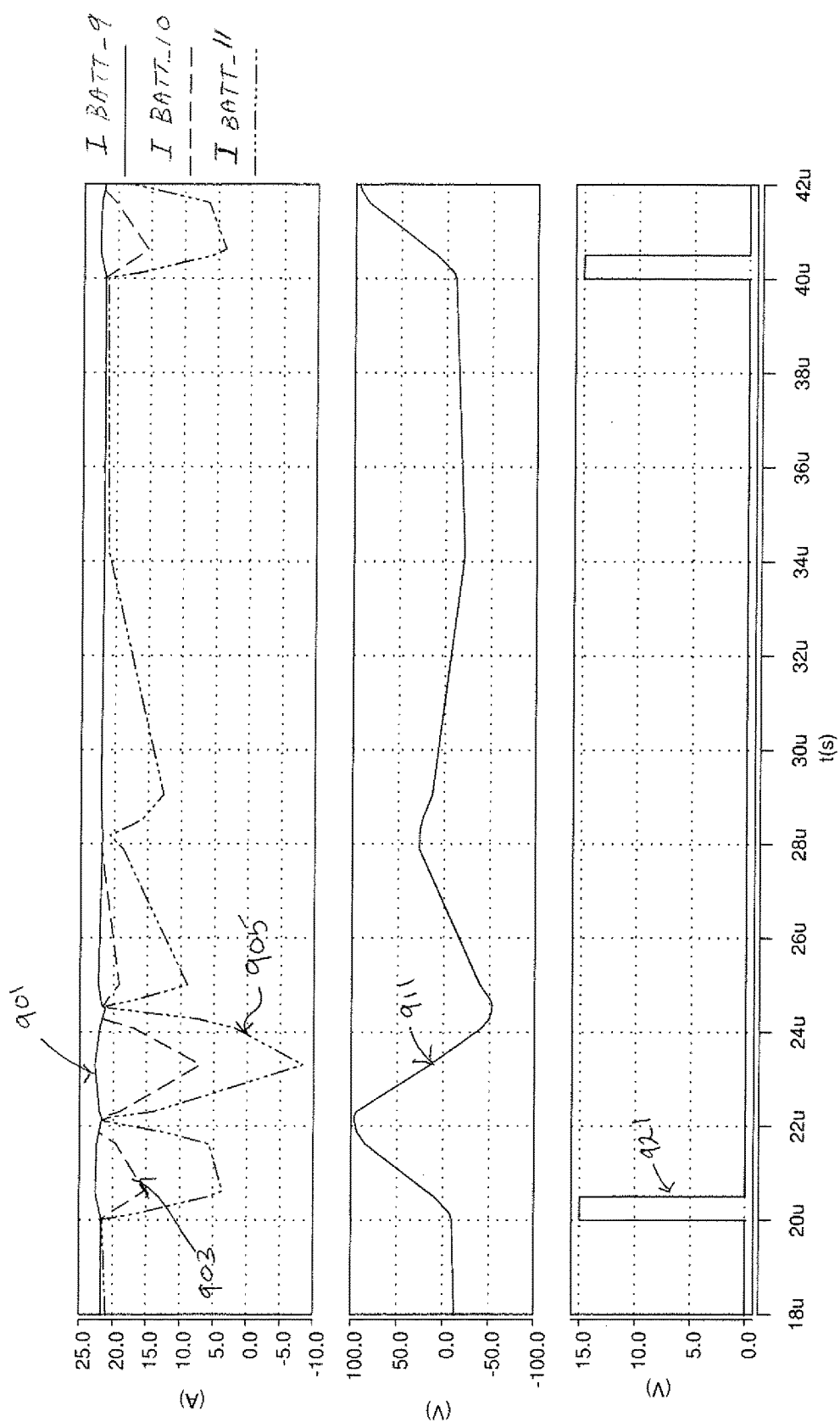
FIG. 9 is a set of waveforms to illustrate the operation of the battery management circuit of FIG. 8.

The current through the batteries for one cycle is shown on FIG. 9 for the circuit of FIG. 8. As shown on the circuit simulation output, most of the current goes into the empty battery, a little current goes into the cell that has a charge level of 10% and no current goes into the other cells.

The bottom trace 921 of FIG. 9 is the gate voltage of the low side DMOS HBD2 in the half bridge at node n_1. The middle trace 911 is the voltage across C1 at node n_2. The top trace actually has 3 current waveforms. The top waveform 901 is the current I9 through battery BATT_9. The middle waveform 903 is the current I10 through BATT_10. The bottom waveform 905 is the current I11 through battery BATT_11. Without the BMS, all currents would be the same corresponding to the current generated by the load. The current through battery BATT_11 is less than the load current as a large part of the current comes from the BMS as it attempts to hold the voltage of said battery above the minimum voltage specified for the batteries.

The foregoing detailed description has been presented for purposes of illustration and description. It is not intended to be exhaustive or to limit the above to the precise form disclosed. Many modifications and variations are possible in light of the above teaching. The described embodiments were chosen in order to explain the principles involved and its practical application, to thereby enable others to best utilize the various embodiments and with various modifications as are suited to the particular use contemplated. It is intended that the scope be defined by the claims appended hereto.

It is claimed:

1. A battery management circuit, for managing a plurality of batteries connectable in a series, with N being a number of batteries in the plurality of batteries including a first battery in the series and a last battery in the series, wherein each battery in the series, except for the last battery, has a subsequent battery in the series, the battery management circuit comprising:
   a plurality of N cell connections, each corresponding to a battery of the plurality of batteries, whereby the plurality of batteries is connectable between a load output and a ground such that a positive terminal of each battery in the series is connected to a negative terminal of its subsequent battery in the series, except that a negative terminal of the first battery in the series is connected to the ground and a positive terminal of the last battery in the series is connected to the load output;
   a transformer having a primary winding and N+1 secondary windings;
   a plurality of N first diodes and a plurality of N second diodes,
   (a) wherein each cell connection of the plurality of N cell connections is connected with a first polarity across one of the secondary windings through a corresponding one of the N first diodes and connected with a polarity opposite to the first polarity across another one of the secondary windings through a corresponding one of the N second diodes, and
   (b) wherein, for connections corresponding to each battery of the plurality of batteries except the last battery in the series, a first corresponding secondary winding connected through a corresponding first diode of the plurality of N first diodes is the same as a second corresponding secondary winding connected through a corresponding second diode of the plurality of N second diodes to corresponding cell connections corresponding to said each battery's subsequent battery in the series;
   a drive circuit connected to provide a voltage to the primary winding when enabled; and
   a cell voltage monitoring circuit configured to enable the drive circuit in response to a voltage level of one or more battery of the plurality of batteries being less than a first limit.

2. The battery management circuit of claim 1, wherein:
   the plurality of N cell connections each have a positive terminal and a negative terminal respectively configured for connection to a positive terminal and a negative terminal of a battery;
   each of the primary winding and the N+1 secondary windings has a first terminal and a second terminal; and
   wherein each cell connection of the plurality of N cell connections is connected across one of the N+1 secondary windings through the corresponding one of the N first diodes oriented for current flow from the first terminal of said one of the N+1 secondary windings to positive terminal of the cell connection and connected across said another one of the N+1 secondary windings through a corresponding one of the plurality of N second diodes oriented for current flow from the negative terminal of the cell connection to the first terminal of said another one of the N+1 secondary windings.

3. The battery management circuit of claim 1, wherein the cell voltage monitoring circuit includes a microcontroller into which a value for the first limit is programmable.

4. The battery management circuit of claim 1, wherein the drive circuit includes a half bridge drive circuit.

5. The battery management circuit of claim 4, wherein the drive circuit further includes:
   an inductor through which the half bridge drive circuit is connected to the primary winding; and
   a capacitor through which the primary winding is connected to the ground, with the capacitor, the primary winding, and the inductor forming a resonant circuit.

6. The battery management circuit of claim 1, wherein the cell voltage monitoring circuit includes a current sensor through which the primary winding is connected to the ground.

7. The battery management circuit of claim 1, wherein each cell connection of the plurality of N cell connections is configured for connection to the plurality of batteries.

8. The battery management circuit of claim 1, further comprising:
   charging circuitry, connected to the cell voltage monitoring circuit, coupled to the plurality of N cell connections, and having an AC input,
   wherein, in response to the cell voltage monitoring circuit detecting a voltage across the plurality of N cell connections being at or below a second limit, the cell voltage monitoring circuit activates the charging circuitry, where the second limit is a minimum allowable terminal voltage of the plurality of batteries.

9. A battery management circuit, usable with a plurality of batteries to be operated in a series, the series being from a first battery to subsequent batteries to a last battery, each battery having a positive terminal and a negative terminal, the battery management circuit comprising:
   a plurality of cell connection nodes, with each cell connection node corresponding to a respective battery of the plurality of batteries, each cell connection node connectable to the positive terminal of the cell connection node's respective battery, the plurality of cell connection nodes configured such that when the plurality of batteries is coupled to the plurality of cell connection nodes, the negative terminal of the first battery is coupled to a ground, the positive terminal of each respective battery is coupled to its respective cell connection node and to the negative terminal of an immediately subsequent battery, and the positive terminal of the last battery is coupled to a load output;

a transformer having a primary winding and a plurality of secondary windings, wherein each winding of the primary winding and the plurality of secondary windings has two terminals, a first of which is a dot terminal and a second of which is a non-dot terminal;

a plurality of diodes each having a first diode terminal and a second diode terminal wherein current flows more readily from the first diode terminal to the second diode terminal than from the second diode terminal to the first diode terminal;

a plurality of stages, one stage for each cell connection node in the plurality of cell connection nodes, with the plurality of stages forming a series according to their respective batteries from a first stage to a last stage, wherein a stage for a given cell connection node is coupled to the given cell connection node's respective battery's positive terminal and comprises:
  (a) a respective secondary winding, of the plurality of secondary windings, coupled to the cell connection node of the stage at the non-dot terminal of the respective secondary winding,
  (b) a first diode coupled by its second diode terminal to the cell connection node of the stage; and
  (c) a second diode coupled by its second diode terminal to the dot terminal of the respective secondary winding of the stage;
  wherein, for other than the first stage, the first diode terminal of the first diode is coupled to the dot terminal of the respective secondary winding of an immediately prior stage and the first diode terminal of the second diode is coupled to the non-dot terminal of the respective secondary winding of the immediately prior stage, and
  wherein, for the first stage, the first diode terminal of the first diode is coupled to the dot terminal of an additional secondary winding and the first diode terminal of the second diode is coupled to the non-dot terminal of the additional secondary winding;

a drive circuit for providing a voltage to the primary winding when the drive circuit is enabled; and a cell voltage monitoring circuit configured to enable the drive circuit in response to detecting that a voltage level of one or more battery of the plurality of batteries is a voltage being less than a first voltage limit.

10. The battery management circuit of claim 9, wherein the cell voltage monitoring circuit includes a microcontroller that can be programmed with a value for the first voltage limit.

11. The battery management circuit of claim 9, wherein the drive circuit includes a half-bridge drive circuit.

12. The battery management circuit of claim 11, wherein the drive circuit further includes:

an inductor coupling the half-bridge drive circuit to the primary winding; and a capacitor coupling the primary winding to the ground, wherein a resonant circuit is formed by the capacitor, the primary winding, and the inductor.

13. The battery management circuit of claim 9, wherein the cell voltage monitoring circuit includes a current sensor between the primary winding and the ground.

14. The battery management circuit of claim 9, further comprising:

charging circuitry, connected to the cell voltage monitoring circuit, configured to respond to the cell voltage monitoring circuit detecting that the voltage level of one or more battery of the plurality of batteries is at or below a second voltage limit by applying charge following the detecting, where the second voltage limit is a minimum allowable terminal voltage of the plurality of batteries.

* * * * *